United States Patent
Rawlings et al.

(10) Patent No.: US 9,352,533 B2
(45) Date of Patent: May 31, 2016

(54) ELASTOMERIC RIBLETS

(75) Inventors: Diane C. Rawlings, Bellevue, WA (US); Alan G. Burg, Jr., Des Moines, WA (US)

(73) Assignee: The Boeing Company, Chicago, IL (US)

( * ) Notice: Subject to any disclaimer, the term of this patent is extended or adjusted under 35 U.S.C. 154(b) by 1766 days.

(21) Appl. No.: 12/566,927

(22) Filed: Sep. 25, 2009

(65) Prior Publication Data

US 2010/0282909 A1    Nov. 11, 2010

Related U.S. Application Data

(63) Continuation-in-part of application No. 12/361,840, filed on Jan. 29, 2009.

(51) Int. Cl.
*B64C 1/38* (2006.01)
*B64C 21/10* (2006.01)
*B32B 15/06* (2006.01)

(52) U.S. Cl.
CPC ........................ *B32B 15/06* (2013.01)

(58) Field of Classification Search
USPC .......... 244/130, 198, 199.1, 200, 200.1, 201, 244/203, 204.1, 205, 206
See application file for complete search history.

(56) References Cited

U.S. PATENT DOCUMENTS

| | | | | |
|---|---|---|---|---|
| 5,069,403 A * | 12/1991 | Marentic et al. | ............. | 244/130 |
| 5,133,516 A * | 7/1992 | Marentic et al. | ............. | 244/130 |
| 5,386,955 A * | 2/1995 | Savill | ............. | 244/200 |
| 5,445,095 A * | 8/1995 | Reed et al. | ............. | 244/130 |
| 5,686,003 A * | 11/1997 | Ingram et al. | ............. | 244/134 D |
| 5,848,769 A * | 12/1998 | Fronek et al. | ............. | 244/200 |
| 5,988,568 A * | 11/1999 | Drews | ............. | 244/200 |
| 6,177,189 B1 * | 1/2001 | Rawlings et al. | ............. | 428/343 |
| 6,345,791 B1 * | 2/2002 | McClure | ............. | 244/200 |
| 6,994,045 B2 * | 2/2006 | Paszkowski | ............. | 244/204 |
| 7,041,363 B2 * | 5/2006 | Krohmer et al. | ............. | 244/130 |
| 7,066,551 B2 * | 6/2006 | Johnson | ............. | 244/122 R |
| 7,070,850 B2 * | 7/2006 | Dietz et al. | ............. | 244/130 |
| 7,101,448 B2 * | 9/2006 | Wydra | ............. | 148/527 |
| 7,300,112 B2 * | 11/2007 | Johnson | ............. | 244/118.6 |
| 7,861,969 B2 * | 1/2011 | Guzman et al. | ............. | 244/120 |
| 8,413,928 B2 * | 4/2013 | Rawlings et al. | ............. | 244/130 |
| 2004/0126541 A1 | 7/2004 | Dietz et al. | | |
| 2007/0194178 A1 * | 8/2007 | Lang | ............. | 244/130 |
| 2008/0061192 A1 * | 3/2008 | Sullivan | ............. | 244/200 |
| 2008/0226843 A1 * | 9/2008 | Fukubayashi et al. | ............. | 427/597 |
| 2008/0290214 A1 * | 11/2008 | Guzman et al. | ............. | 244/119 |
| 2010/0108813 A1 * | 5/2010 | Lang | ............. | 244/130 |
| 2010/0127125 A1 * | 5/2010 | Li et al. | ............. | 244/119 |
| 2010/0264665 A1 * | 10/2010 | Hebert | ............. | 244/1 A |
| 2011/0186685 A1 * | 8/2011 | Tsotsis et al. | ............. | 244/130 |

FOREIGN PATENT DOCUMENTS

| | | |
|---|---|---|
| DE | 101 44 259 A1 | 3/2003 |
| WO | 2007036349 A1 | 4/2007 |
| WO | 2009000703 A1 | 12/2008 |

* cited by examiner

*Primary Examiner* — Tien Dinh
*Assistant Examiner* — Steven Hawk
(74) *Attorney, Agent, or Firm* — Felix L. Fischer

(57) ABSTRACT

An array of aerodynamic riblets incorporates a high elongation elastomeric layer having spaced tips and optionally a protective cladding. The elastomeric layer may be adhered to an aerodynamic surface directly or as an appliqué in combination with one or more of an adhesive layer, one or more supporting polymer layers and a metal foil layer.

14 Claims, 9 Drawing Sheets

ELASTOMERIC RIBLETS

REFERENCE TO RELATED APPLICATIONS

This application is a continuation in part of U.S. patent application Ser. No. 12/361,840 entitled Rigid Tipped Riblets filed on Jan. 29, 2009 by inventors Diane C. Rawlings and Kevin R. Malone, the disclosure of which is incorporated herein by reference. This application is copending with U.S. patent application Ser. No. 12/361,882 entitled Shape Memory Riblets by inventors Diane C. Rawlings and Terry L. Schneider and U.S. patent application Ser. No. 12/361,918 entitled Amorphous Metal Riblets by inventors Diane C. Rawlings and Stephen Christensen both filed on Jan. 29, 2009 the disclosures of which are incorporated herein by reference. This application is also copending with U.S. patent application Ser. No. 12/566,907 filed substantially concurrently herewith entitled Structurally Designed Aerodynamic Riblets by inventors Diane C. Rawlings, James McLean and Mary J. Mathews, which is incorporated herein by reference.

BACKGROUND INFORMATION

1. Field

Embodiments of the disclosure relate generally to the field of surface geometries for aerodynamic improvements to aircraft or surfaces having a flow interface and more particularly to embodiments and fabrication methods for use of high elongation elastomeric materials to form aerodynamic riblets or other high-aspect-ratio surface microstructures requiring high durability.

2. Background

Increasing fuel efficiency in modern aircraft is being accomplished through improvement in aerodynamic performance and reduction of structural weight. Recent advances in the use of microstructures such as riblets on aerodynamic surfaces have shown significant promise in reducing drag to assist in reducing fuel usage. Riblets have various forms but advantageous embodiments may be ridge-like structures that can reduce drag in areas of a surface of an aircraft exposed to a turbulent boundary layer. The riblet ridges tend to inhibit turbulent motions involving lateral velocities, thus reducing the intensity of small-scale streamwise vortices in the lower part of the boundary layer, and thus reducing skin-friction drag.

In certain tested applications riblets have been pyramidal or inverted V shaped ridges spaced on the aerodynamic surface to extend along the surface in the direction of fluid flow. Riblet structures have typically employed polymeric materials, typically thermoplastic or thermoset polymers. However in service use such as on an aircraft aerodynamic surface, polymers are relatively soft thus reducing the durability of the surface. Existing solutions with polymeric tips may readily deform hundreds of percent with fingernail pressure and may be unrecoverable since the thermoplastic polymer (fluoropolymers such as THV or FEP for example) has "yielded" or the thermoset (structural epoxy for example) has fractured at relatively low strain. Thermoplastic or low-elasticity thermosets deform readily with a fingernail cross wise to the riblet ridges/grooves, either by plastic deformation or by cavitation and cracking. Such structures may be undesirable in normal service use on an aircraft or other vehicle. Additionally certain aircraft surfaces are required to withstand interactions with various chemicals including Skydrol®, a hydraulic fluid produced by Solutia, Inc.

The practicality of riblets for commercial aircraft use would therefore be significantly enhanced with a riblet structure providing increased durability and aircraft fluids compatibility.

SUMMARY

Exemplary embodiments provide a construction for an array of riblets comprising a first layer composed of high elongation elastomeric riblets having tips and a surface layer. A second layer is provided for adherence to a surface.

In various embodiments the high elongation elastomeric material has capability for elongation of 300-3000% (including the categories of high elongation elastomers (300-500%) and elastomers with ultra high elongation defined herein to be in the range of 500% to 3000% collectively referred to herein as high elongation elastomers) and is selected from the set of polymers and copolymers (typically block copolymers) and shape memory polymers of epoxy, polyurethane, polyurea, polyolefin, ethylene propylene, silicone, polybutadiene, polychloroprene, chlorinated polyethylene and fluorosilicones, fluorinated polyurethanes, sylilated polyurethanes, and other hybrid polymers that include polyhedral oligomeric silsesquioxane (POSS). The elastomeric polymer may be filled or unfilled. Fillers may include submicron pigmentation, UV-stabilizers and absorbers, tougheners, dispersion aids or flow aids including materials such as titanium dioxide, organic dyes, diamond powder, fluoropolymers or POSS. In certain embodiments, a sub-micron (molecular or nanoscale) "cladding" on the riblet surface or overlaying the tips and surface layer is selected from either organic and inorganic moieties or hybrids. Organic cladding is selected from the set of thin films of parylene, PTFE, polyamide (Nylon), polyimide and polyethylene. Inorganic cladding may be thin films or multilayer films including amorphous diamond like coatings (DLC), metals such as aluminum, chromium, gold, platinum, rhodium or nickel, and oxides such as silicon dioxide, aluminum oxide, indium tin oxide, tin oxide, titanium oxide, zinc oxide, and nitrides such as boron nitride and silicon nitride. Hybrid cladding might be organic-inorganic sol gels or pendant POSS or organo-metallic monolayers, or nanolayers such as metal-polymer or ceramic-metal or ceramic-polymer nanolayer. The cladding may be self-assembled or deposited via one of many different processes including sputtering, plasma deposition or dip coating In certain embodiments, a polymer support layer selected from the set of polyurethanes, polyetheretherketone (PEEK), polyethereketoneketone (PEKK), polyetherketone (PEK), polyimide, polyamide, polyolefin, polyester, chloro- or fluoro-polymers such as polytetrafluoroethylene (PTFE), fluorinated ethylene propylene (FEP) or fluorinated polyurethane, polyethylene tetraphthalate (PET), silicones, epoxy, polysulfide, ethylene propylenediene, fluorosilicone, and fluoroelastomers may be deposited on the high elongation elastomeric layer. Multilayers of polymers, magnetic materials and/or metal films/foils or non-continuous metal or magnetic layers may also be deposited on the elastomeric layer to provide additional properties or functions. In yet other embodiments, an adhesive layer is deposited on the polymer support layer to form a multi layer appliqué, said adhesive layer adhering the appliqué to a surface of the aircraft.

The embodiments disclosed are fabricated in an exemplary method by forming a master tool having protuberances or depressions/indents corresponding to a desired riblet array and forming a complementary tool from the master tool. A high elongation elastomeric layer having tips and a surface layer is deposited in the complimentary tool. An adhesive layer is then deposited to from an appliqué, which is removed from the complementary tool and the high elongation elastomeric appliqué is adhered to an aerodynamic surface.

In a further alternative methods for web processing, the complimentary tool is a roll-to-roll tool and a polymer layer, a metallic layer or a combination of polymer and metallic layers, such as an LSA, is deposited intermediate the adhesive layer and the elastomeric layer. A thin film coating or modification of the riblet exterior surface for decorative appearance and/or to provide electrical conductivity/resistance (to mitigate static charging), UV reflectivity or absorption (to improve long term durability in high solar/high altitude environments) and/or to reduce transport across the surface to improved oxidation and/or fluid resistance may be sputtered (or otherwise deposited) onto the complimentary tool prior to deposition of the high elongation elastomeric layer or deposited onto the high elongation elastomeric layer after removal from the complimentary tool. In modifications to these methods, ion implantation or chemical surface modification my be to form a layer or modified surface on the riblets.

The features, functions, and advantages that have been discussed can be achieved independently in various embodiments of the present invention or may be combined in yet other embodiments further details of which can be seen with reference to the following description and drawings

DETAILED DESCRIPTION

Figure 1:
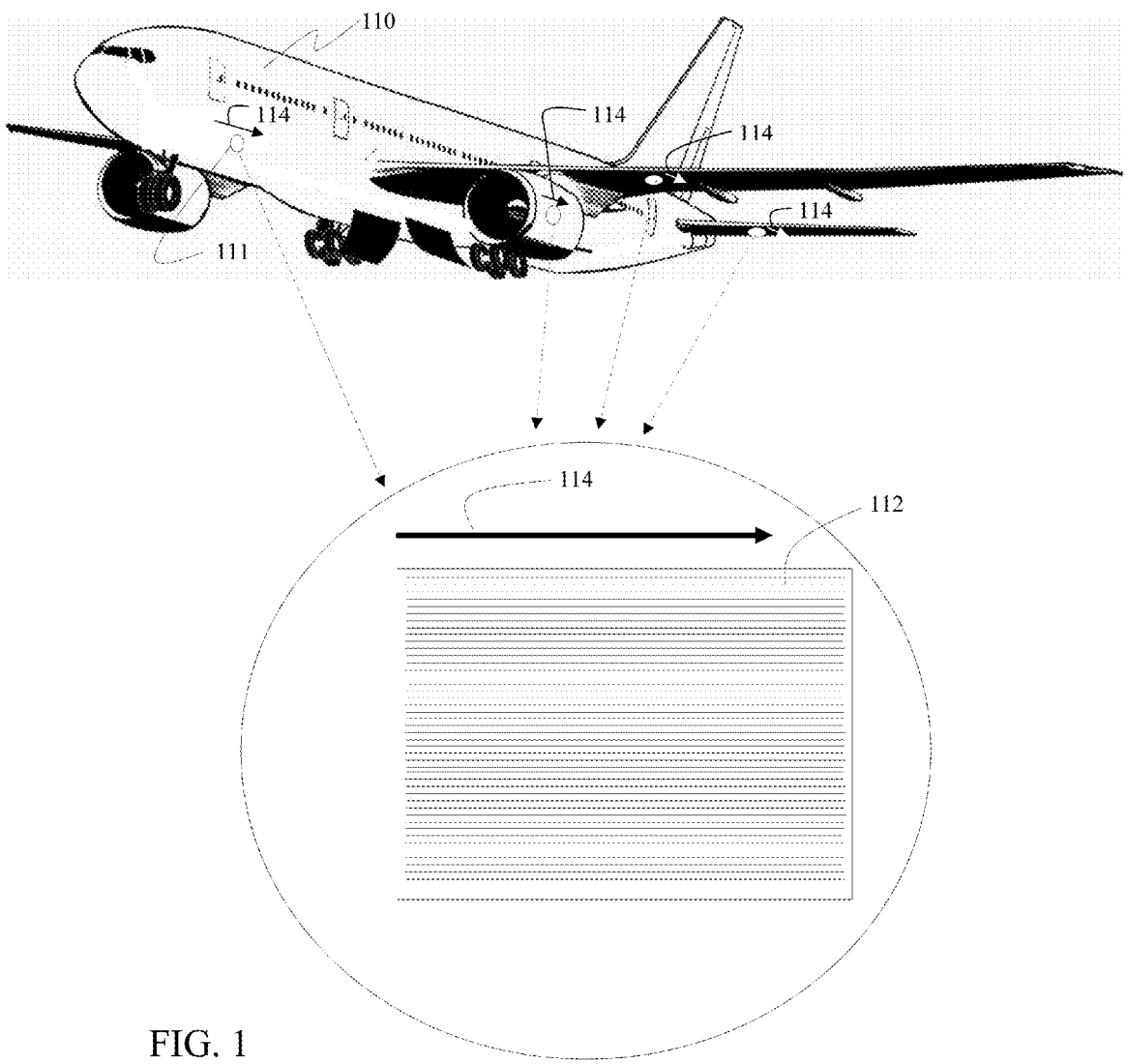
FIG. 1 is an isometric view of a portion of an aerodynamic surface such as a wing or fuselage skin showing exemplary riblets extending in the flow direction.

The embodiments disclosed herein provide riblets constructed with high elongation elastomeric materials that may be impacted by ground support equipment, ground support personnel or environmental hazards such as hail without permanent deformation/damage. These embodiments also allow an optimized structural design of riblets providing the capability for them to be thinner, lower weight, and more aerodynamically efficient. An exemplary embodiment of elastomeric riblets having a structure as will be described in greater detail subsequently is shown as a portion of an aerodynamic surface for an aircraft as shown in FIG. 1. The aircraft 110 employs a structure with a surface 111, shown enlarged, having multiple substantially parallel riblets 112 arranged parallel to the flow direction as represented by arrow 114. For the exemplary embodiment shown, the height dimension 116 perpendicular to the surface 111 is approximately 0.002 inch while the spacing 118 between the riblets is approximately 0.003 inch as shown for example in FIG. 2A. Spacing or distribution of the riblets in an array may vary depending on and be predetermined by the fluid dynamic properties of the air, water or other fluid for which the application of riblets is employed. While described herein with respect to an aircraft, the embodiments disclosed are equally applicable to cars, boats, windmills, rotor blades, engine nacelles, intake ducts, ventilation systems or other surfaces with associated hydrodynamic or aerodynamic flow. The aerodynamic surface is typically, without limitation, curved and may be a portion of a wing, an engine nacelle, a control surface, a fuselage or other suitable surface. Therefore flexibility and conformability of the riblets and any structure supporting and affixing the riblets to the surface may be required. While described herein with respect to an aircraft aerodynamic surface the embodiments disclosed herein are equally applicable for drag reduction on surfaces of other aerospace vehicles such as, without limitation, missiles or rockets and other vehicles such as cars, trucks, buses and trains moving in a gaseous fluid, commonly air, or on boats, submarines, hydrofoils, fluid flow conduits or other surfaces exposed to liquid fluid flow.

The embodiments disclosed herein recognize and provide the capability for riblets that may resist various impacts and/or other forces that may cause damage to the riblets affecting both aerodynamic performance and appearance and potentially ice accumulation and also affecting the riblet lifetime, i.e. the durability. Further, certain of the different advantageous embodiments provide a multi-layer structure that may have a support layer and a plurality of riblet tips located on or extending from the support layer. The tips which form the riblets may be fabricated from high elongation elastomeric materials providing recovery after deforming with elongation in a range of 300% to 3000% (including the categories of high elongation elastomers (300-500%) and elastomers with ultra high elongation defined for our purposes to be in the range of 500% to 3000%).

For the exemplary usage of embodiments disclosed herein on an aircraft, a combination of shear, compression and tensile forces due to various maintenance and damage events are anticipated. Larger lateral deformations with a cross-wise gouging motion with a maintenance tool or edge of an object are anticipated. Even a fingernail will cause very high elongations for the tip of the riblet. A gouge is one of the most damaging of actions expected because of the narrowness of the object that is scraping along the surface. The stiffer the riblet, the less deformation and therefore, the more the forces will be tensile and compression. This is because the riblets are very closely spaced and any object larger than the spacing of approximately 0.003 inch will be applying load only to the tip of the riblet until it has deformed enough to either gain access to the side of the riblet or enough compression force and adhesion to create shear. Engineered elastomers that have both a high initial modulus and a high or ultra high elongation are possibly the best options for this application. The higher the modulus, the less elongation is required, and the higher the recoverable elongation, the lower the acceptable modulus. The range of % elongation as described herein is wide to accommodate varying requirements with both the tensile and compressive modulus and the temperature at which the damage event occurs. The amount of deformation is dependent on the stiffness or modulus of the elastomer, the surface frictional/adhesion forces, the thickness and the specific elastomers molecular structure (Note that the modulus is a function of temperature—stiffer when cold). The rate of deformation due to a slipped tool or gouge can be very fast, >>500 inches per minute (in exemplary cases 2,000-4,000 inches per minute). The faster the rate, the higher the modulus (because the polymers need some time to fully respond to the load), but the ultimate elongation may be the same. Initial modulus at room temperature for exemplary tested embodiments is about 5000-15000 psi and as the deformation increases the modulus changes to 300-400 psi.

Figure 2A:
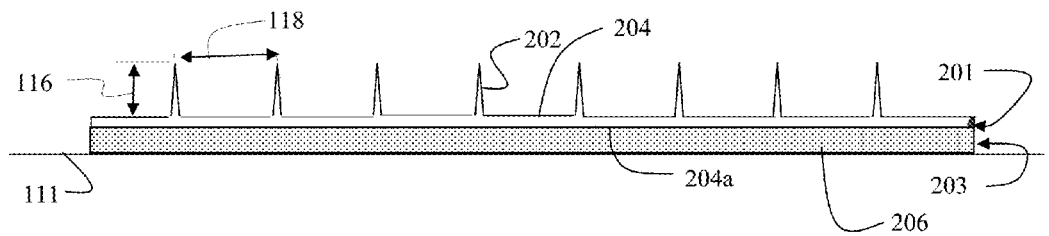
FIG. 2A is a lateral section view looking into the flow direction of a first embodiment for high elongation elastomeric riblets.

A first embodiment for high elongation elastomeric riblets is shown in FIG. 2A as a multilayer construction. Individual tips 202 of the riblets protrude from a surface layer 204 to provide a first layer 201 of the multilayer construction. The protruding riblets and continuous surface layer are formed by casting or deposition, as will be described in greater detail subsequently, of the high elongation elastomer such as a urethane similar to PRC PR 1664D used in an exemplary embodiment. In various embodiments the high elongation elastomer may be selected from the set of polymers and copolymers (typically block copolymers) and shape memory polymers of epoxy, polyurethane, polyurea, polyolefin, ethylene propylene, silicone, polybutadiene, polychloroprene, chlorinated polyethylene and fluorosilicones, fluorinated polyurethanes, perfluoropolyethers, sylilated polyurethanes, and other hybrid polymers that include polyhedral oligomeric silsesquioxane (POSS). The elastomeric polymer may be filled or unfilled. Fillers may include submicron pigmentation, UV-stabilizers and absorbers, tougheners, dispersion aids or flow aids including materials such as titanium dioxide, organic dyes, diamond powder, fluoropolymers or POSS. For the embodiment shown in FIG. 2A a second layer 203 created by an adhesive layer 206 is deposited on a bottom 204a of the surface layer 204. This adhesive could be one of many possibilities including, without limitation, pressure sensitive acrylic adhesives, polyurethane pressure sensitive adhesives, polysulfide, epoxy, thermoplastics, thermally-reactive adhesives, silicone adhesives, or fluorosilicone adhesives.

Figure 2B:
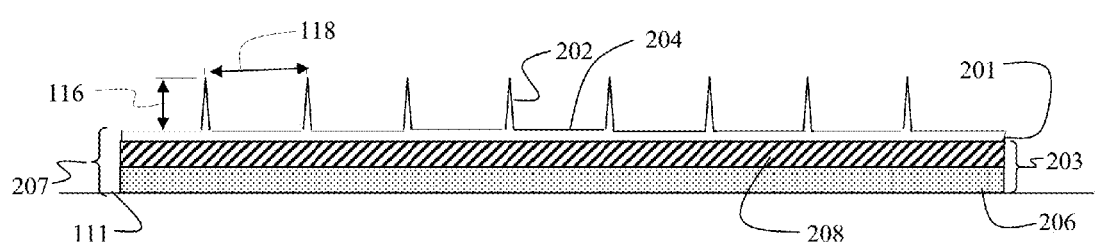
FIG. 2B is a lateral section view of a modification of the embodiment of FIG. 2A with an additional support layer.

In alternative embodiments, a supporting polymer layer 208 engages the surface layer 204 intermediate the surface layer 204 and adhesive layer 206 as shown in FIG. 2B as a portion of the second layer. The supporting polymer layer 208 may be a polymer film or other suitable material. In certain embodiments polyetheretherketone (PEEK), polyetheretoneketone (PEKK), polyetherketone (PEK), polyimide, polyamide, polyolefin, polyester, chloro- or fluoro-polymers such as polytetrafluoroethylene (PTFE), fluorinated ethylene propylene (FEP) or fluorinated polyurethane, polyethylene tetraphthalate (PET), silicones, epoxy, polysulfide, ethylene propylenediene, fluorosilicone, and fluoroelastomers may be employed as the supporting polymer layer. The supporting polymer, adhesive and/or other elements in the second layer provide additional resilience (or physical support for thin metal layers or for other function such as dielectric isolation for lightning protection or for electrical circuits) and the ability to adhere to the surface and may be prepared as a prefabricated appliqué on which the high elongation elastomer of the surface layer and tips is deposited or formed.

Figure 2C:
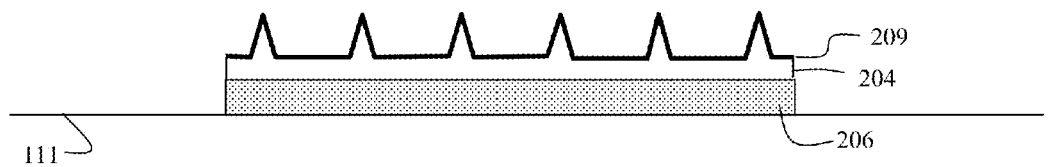
FIG. 2C is a lateral section view of a modification of the embodiment of FIG. 2A with surface modification or cladding over the elastomer.

FIG. 2C is an additional alternative embodiment wherein the high elongation elastomer is coated with a surface cladding 209. For the embodiment shown, cladding 209 is a transparent but ultra-violet (UV) absorptive coating such as zinc oxide or indium tin oxide. The cladding may also provide alternative functionality such as UV reflectivity, electrical conductivity/resistivity to dissipate or conduct p-static charges (<500 Ohm/square) or provide coloration or other decorative effects. In various alternative embodiments to achieve the desired functionality, the cladding is selected from either organic and inorganic moieties or hybrids. Organic cladding is selected from the set of thin films of parylene, PTFE, polyamide (Nylon), polyimide and polyethylene. Inorganic cladding may be thin films or multilayer films including amorphous diamond like coatings (DLC), metals such as aluminum, chromium, gold, platinum, rhodium or nickel, and oxides such as silicon dioxide, aluminum oxide, indium tin oxide, tin oxide, titanium oxide, zinc oxide, and nitrides such as boron nitride and silicon nitride. Hybrid cladding may be organic-inorganic sol gels or pendant POSS or organo-metallic monolayers, or nanolayers such as metal-polymer produced by Modumetal 1443 N. Northlake Way, Seattle, Wash. 98103, or ceramic-metal or ceramic-polymer nanolayer. The cladding may be self-assembled or deposited via one of many different processes including sputtering, plasma deposition or dip coating The elastomeric surface layer 204 may then be adhered to a surface using an adhesive layer 206 or directly as described with respect to FIG. 2D.

It is anticipated that many embodiments of the protective cladding 209 will not have elongation properties similar to the high elongation elastomer tips 202 and surface layer 204 and will fracture within the elastic limit of the high elongation elastomer. Cracking of the cladding (which may be on the nanoscale) under loading which is within the recoverable deflection of the high elongation elastomer is expected and upon elimination of the load and upon recovery of the elastomer to near original shape, UV protection or other function of the cladding, which remains adhered to the elastomeric tips and surface layer even though cracked, will be substantially maintained.

If the deposition of the cladding is done to the riblet itself the riblet surface may be treated prior to deposition by plasma treatment or corona treatment. Alternatively, energetic process such as sputtering or other vacuum processes with e-beam or ion beam enhancement or by a process such as ion implantation may be employed. These energetic processes drive atoms of the cladding into the surface of the elastomer and also create very reactive surfaces for bonding/attachment. Sputtered metal films adhere well but have a relatively low cohesive strength. Sputtered films of oxides or multilayered coatings can be very well adhered and also have high internal strength as long as material compatibilities are taken into account. In certain embodiments addition of layers in the cladding may be accomplished to reduce stresses or as intermediate bonding or strain isolation layers.

In yet other embodiments, enhancing the adhesion may be accomplished by components in the elastomer either as fillers or as molecular entities that cause a reactive and/or submicron/nano textured surface. Examples are POSS fillers and pendant POSS groups incorporated into the polymer chains.

However, in further alternative embodiments, the layer(s) (composition and thickness) of the cladding may be designed to be structurally compatible and minimize the interfacial stress on elongation) using FEM, thin film and molecular design tools.

The cladding 209 may provide resistance to electromagnetic effects such as static charge dissipation which the riblet surface alone may not provide thereby substituting for or supplementing LSA foil appliqués and similar materials as subsequently described for the embodiment in FIG. 2E. The cladding 209 may also be multilayer or interference film which may provide color and decorative effects.

In the form shown in FIG. 2A, 2B or 2C, the embodiment may be fabricated as a multilayer appliqué 207 as shown in FIG. 2B, including tips 202, surface layer 204, supporting polymer layer 208 and adhesive layer 206 which can then be adhered to the aerodynamic surface using the adhesive layer 206.

Figure 2D:
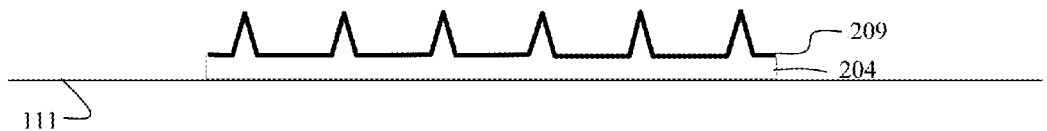
FIG. 2D is a lateral section view of a modification of the embodiment of FIG. 2C without an adhesive layer for direct thermoplastic bonding.

In alternative embodiments, the surface layer 204 may be directly adhered to or deposited on the aircraft surface 111. FIG. 2D demonstrates an embodiment similar to that described with respect to FIG. 2C however, no adhesive layer is employed. In alternative embodiments, supporting polymer layer 208 may employ a thermoplastic (or thermosetting resin such as an epoxy) in a configuration similar to that disclosed in FIG. 2B without an adhesive layer which allows direct bonding to the aircraft surface 111 with application of heat.

Figure 2E:
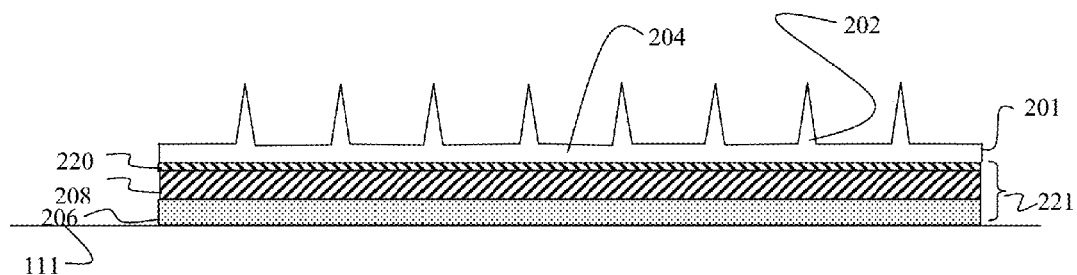
FIG. 2E is a lateral section view of an embodiment employing a multilayer Lightning Strike Appliqué LSA.
Figure 2F:
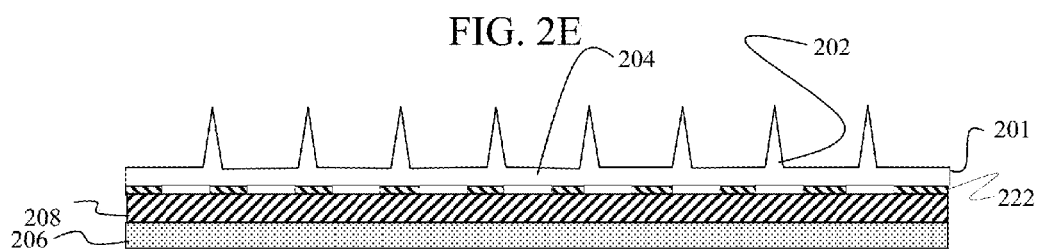
FIG. 2F is a lateral section view of an embodiment employing a multilayer structure with a Wide Area Lightning Diverter Overlay (WALDO) metallic layer.
Figure 2G:
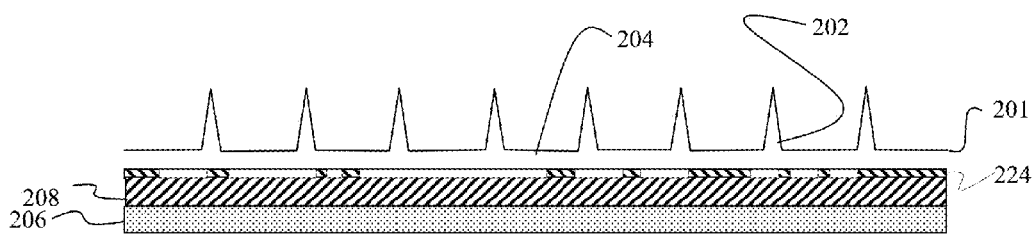
FIG. 2G is a lateral section view of an embodiment employing a multilayer structure incorporating electrical circuits.

For the embodiment shown in FIG. 2E, a multilayer structure 221 incorporating a metal mesh/inductive grid, capacitive grid, or foil 220 such as aluminum, a supporting polymer layer 208 such as PEEK and an adhesive layer 206 supports the high elongation elastomer layer 201. The metal foil 220 provides a conducting material for lightning strike protection in an exemplary aircraft usage of the embodiment. The foil, polymer and adhesive multilayer structure 221 may be comparable to a current Lightning Strike Appliqué (LSA) employed for composite aircraft structural surfaces such as that disclosed in U.S. patent application Ser. No. 11/611,023 to Rawlings filed on Dec. 14, 2006 entitled LIGHTNING STRIKE PROTECTION METHOD AND APPARATUS. The metal layer in alternative embodiments may be discontinuous and may provide a structure of metallic diverter strips 222 for a Wide Area Lightning Diverter Overlay (WALDO) Ser. No. 11/229,911 to Rawlings et al. filed on Sep. 19, 2005 entitled WIDE AREA LIGHTNING DIVERTER OVERLAY as shown in FIG. 2F or integrated electronic circuits 224 within the multilayer structure as disclosed in companion application Ser. No. 11/612,576 to Rawlings filed on Dec. 19, 2006 entitled LARGE AREA CIRCUITRY USING APPLIQUES, as shown in FIG. 2G, the disclosures of which are incorporated herein by reference.

Figure 3A:
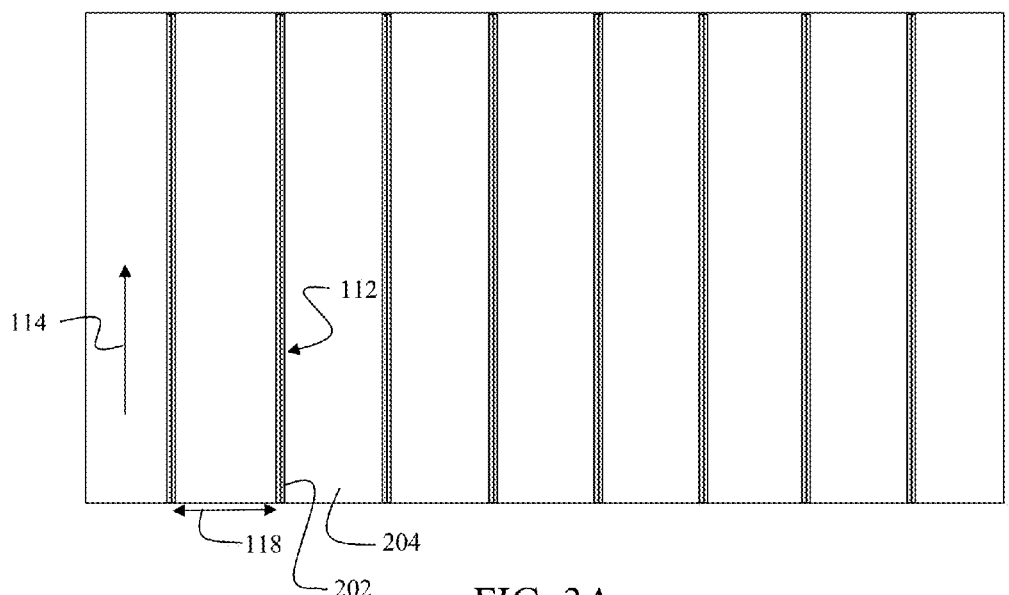
FIG. 3A is a top view of a portion of an aerodynamic surface employing riblets of the embodiment as shown in FIG. 2B.
Figure 3B:
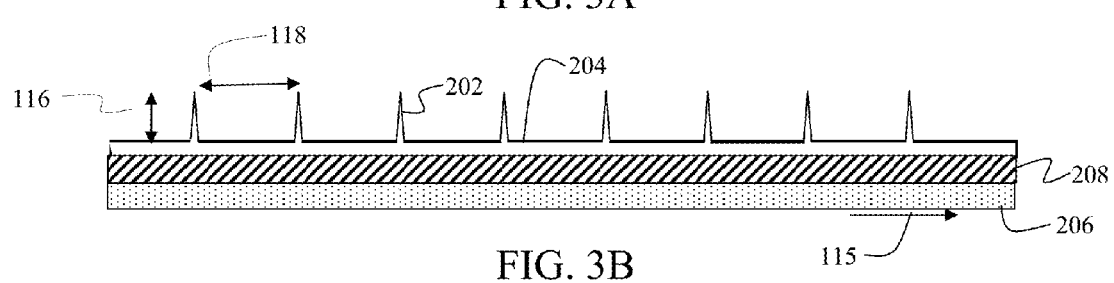
FIG. 3B is a section view comparable to FIG. 2B for reference with the features of FIG. 3A.

FIGS. 3A and 3B show top and side views of the embodiment as disclosed in FIG. 2B as an example of the riblet arrays resulting from the disclosed embodiments. The riblets 112 formed by the tips 202 expand longitudinally along surface layer 204 in the flow direction 114. The thin surface layer 204 provides for flexibility in adhering to curvature having tangents substantially perpendicular to the riblets 112 as represented by arrow 115. The properties of the high elongation elastomer used in the embodiments described allows flexibility in deformation of the appliqués to match surface contours of the aircraft or other surface on which the riblet arrays are applied.

Figure 4:
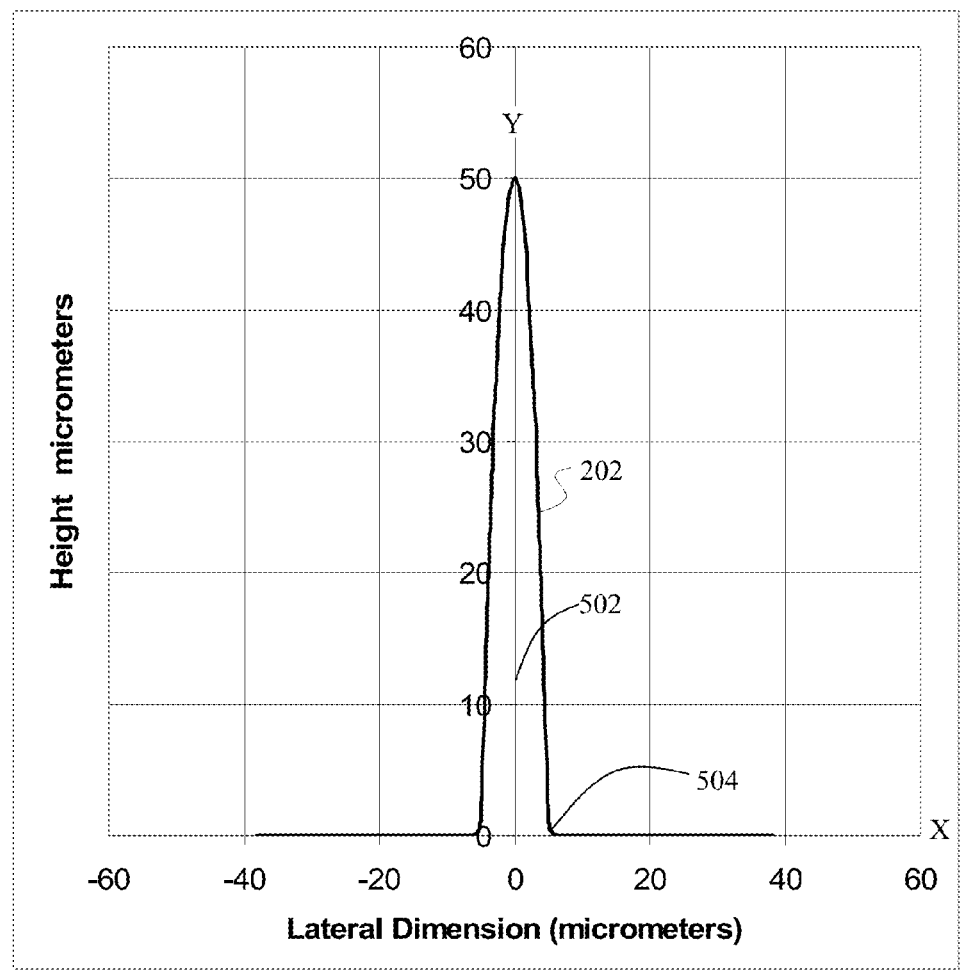
FIG. 4 is a detailed view of one riblet tip of the embodiment of FIG. 2A with a parabolic profile.

Shaping of the riblet profile for equalized stress over the height of the riblet to maximize the benefit of the high elongation elastomer is described in detail in copending application Ser. No. 12/566,907, entitled Structurally Designed Aerodynamic Riblets. As shown in FIG. 4, individual riblet tips 202 for the embodiments disclosed herein may incorporate a parabolic shape cross section having an equation $y=px^2+h$ with respect to a y-axis 502 where h is the riblet height 116 and the thickness of the riblet t=2x at an elevation of y. Determination of the actual shape parameter, p, may be dependent on the high elongation elastomer selected for the riblets and the desired rigidity of the riblets. For the exemplary embodiment with h=50 microns a value of p=−2 was selected for broad applicability to numerous materials with single machined tooling. A base fillet 504 is defined at the interface between riblets 202 and surface layer 204 for distribution of load to avoid plastic failure or rupture of the surface layer at maximum deflection of the riblets. For the exemplary embodiment, 1 micron was chosen as the fillet radius to maximize the extent of the parabolic shape since it distributes the stress/strain uniformly; and because it is sufficient to eliminate the discontinuity with the planar surface preventing it from becoming the cause of riblet failure under the combined loads. The transition between the fillet and the parabola must be smooth and is done by making the fillet shape tangent to the parabola (and also to the planar surface). In various embodiments, the fillet can be circular, elliptical or parabolic.

The parabolic shaping provides significant benefit because it uniformly distributes the stress and strain along the entire riblet. The higher the recoverable elongation in the material the better because the riblet tips are very fine, especially in the case of the triangular shape where the tips may be 0.1 micron. A fingernail gouge for an elastomer that is 0.1 micron thick can be stretched across more than one and may be multiple riblets which are spaced approximately 90 microns apart which is greater than 900% if only the tip is participating. For the exemplary embodiments, the parabolic riblet folded flat to the planar surface has a maximum strain along the outside edge of only 37%.

FIGS. 5A-5D demonstrate various exemplary processes employed for the embodiments disclosed herein. In general context, an initial master tool having the desired shaping of the riblet array structure is created as either a male or female tool using, as an example without limitation, diamond machining of a copper form or other suitable material. The master tool may be a section of a flat tool, a roller or a rolled film tool or a web tool on which an acrylate, silicone or fluoropolymer is cured as a complimentary tool and then stripped to define spaced protuberances or indentations corresponding to the desired riblet dimensions. Other layers or materials may be added to make a durable tool of the appropriate flatness, stiffness and tensile strength. The high elongation elastomeric tips of the riblet array and surface layer are then created using the complimentary tool by deposition methods include casting, spray, electrophoretic or thermal forming. Most high elongation polymers can be cast from a liquid state via standard roll coating methods such as gravure, 3- or 4-reverse roll, knife over roll, slot die, spray or immersion.

For embodiments where a self adhering thermoplastic is not employed for the elastomer layer, an adhesive layer may be added using direct coating or lamination. Additional layers of supporting polymers and continuous or discontinuous metallic layers may be added for handling strength and additional functionality of the multi-layer appliqué previously described with respect to the various disclosed embodiments. As an alternative to single layer buildup, the surface of a pre-made appliqué without a topcoat (designated a TLA), as an example the exposed foil of an LSA, may be coated and then laminated in the web tool to form the riblets. Another alternative is to coat the web tool and then laminate the pre-made TLA with or without metal foil onto the coated web tool. In yet another alternative, the web tool is coated, cured and then, in a separate step, laminated to the TLA.

Cladding of the riblet tips may be accomplished by depositing the cladding onto the complimentary tool by sputtering, casting or other methods prior to creation of the elastomeric riblet tips and surface layer with the tool. Alternatively, the cladding may be applied to the elastomeric riblets tips after removal from the complimentary tool.

Similarly, the complimentary tool may be stripped from the elastomeric riblet tips and surface layer or the tool may remain attached to the elastomer layer after processing for handling purposes to protect the riblet tips through installation of the appliqué on a surface. Alternatively, a protective mask may be applied to the clad or unclad elastomer layer by deposition or casting after stripping from the complimentary tool to provide the desired handling and protective characteristics.

Figure 5A:
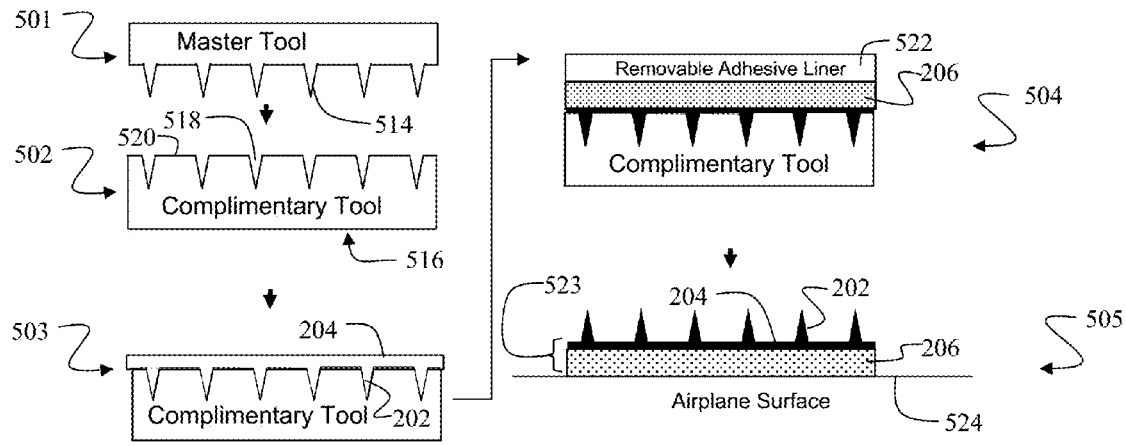
FIG. 5A is a flow diagram of processing steps for an exemplary method of fabrication of riblets of the embodiment of FIG. 2A.

FIG. 5A is a flow diagram showing one exemplary manufacturing process for a riblet structure as defined in the embodiment described with respect to FIG. 2A. In step 501 a master tool or replication of a master tool 512 is created using, as an example without limitation, diamond machining of a copper form or other suitable material as the master tool on which an acrylate, silicone or fluoropolymer is cured as a replication and then stripped to define spaced protuberances 514 or indentations corresponding to the desired riblet dimensions. As previously described, other layers or materials could be added to make a durable tool of the appropriate flatness, stiffness and tensile strength.

The tool 512 as shown in FIG. 5A may be a section of a flat tool, a roller or a rolled film tool employed for roll-to-roll web processing as will be described in greater detail with respect to FIG. 5D. A complimentary tool 516 is created in step 502 by impression on the master tool 512 which provides grooves 518 corresponding to the riblet shape. Spacing between the grooves provides a substantially flat intermediate surface 520 corresponding to the dimension 118 desired between the riblets 112 as described with respect to FIG. 3A. In step 503 high elongation elastomeric tips 202 and surface layer 204 are deposited onto the complimentary tool 516. Possible deposition methods include casting, spray, electophoretic or thermal forming. Most high elongation polymers can be cast from a liquid state via standard roll coating methods such as gravure, 3- or 4-reverse roll, knife over roll, slot die, spray or immersion. In certain embodiments, a submicron release treatment or compound is applied to the surfaces on the complimentary tool to assist in removal of the riblet tips 202 and surface layer 204 from the tool 216. Adhesive layer 206 is then applied via direct coating or lamination in step 504 to the surface layer opposite the tips 202. A removable adhesive liner 522 for handling of the completed multilayer appliqué 523 is added as also shown in step 504. Application to the aircraft surface 524 in step 505 is accomplished by removing the multilayer appliqué 523 from the complimentary tool 516, removal of the adhesive liner 522 followed by attachment of the adhesive layer of the appliqué 523 to aircraft surface 524.

Figure 5B:
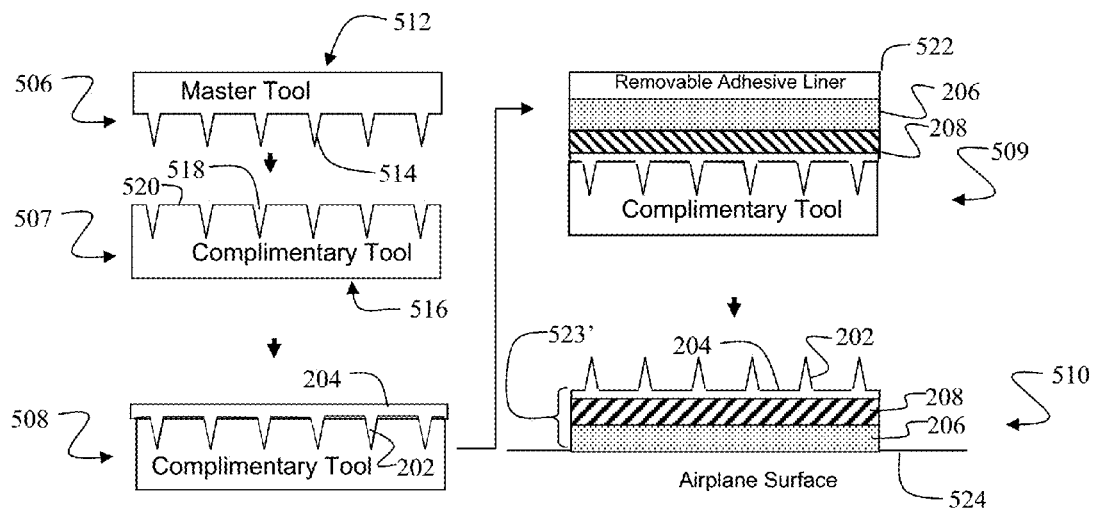
FIG. 5B is a flow diagram of processing steps for an exemplary method of fabrication of riblets of the embodiment of FIG. 2B.

FIG. 5B is a flow diagram showing a manufacturing process for a riblet structure as defined in the embodiment described with respect to FIG. 2B. In step 505 a master tool or replication of a master tool 512 is created using, as an example without limitation, diamond machining of a copper form or other suitable material as the master tool on which an acrylate or other polymeric film is cured as a replication and then stripped to define spaced protuberances 514 corresponding to the desired riblet dimensions. As previously described with respect to FIG. 5A, the tool 512 as shown in FIG. 5B may be a section of a flat tool, a roller or a rolled film tool employed for roll-to-roll web processing as will be described in greater detail with respect to FIG. 5D. A complimentary tool 516 is created in step 507 by impression of the master tool 512 which provides grooves 518 corresponding to the riblet shape. Spacing between the grooves provides a substantially flat intermediate surface 520 corresponding to the dimension 118 desired between the riblets 112 as described with respect to FIG. 3A. In step 508 high elongation elastomeric tips 202 and surface layer 204 are deposited onto the complimentary tool 516 as previously described with respect to FIG. 5A. In certain embodiments, a release compound is applied to the surfaces on the complimentary tool to assist in removal of the riblet tips 202 and surface layer 204 from the tool 216. A polymer support layer 208 is then deposited or applied to the high elongation elastomer layer 201 and an adhesive layer 206 is applied in step 509 to the polymer support layer opposite the high elongation elastomer layer 201. A removable adhesive liner 522 for handling of the completed multilayer appliqué 523' is added as also shown in step 509. Application to the aircraft surface 524 in step 510 is accomplished by removing the multilayer appliqué 523' from the complimentary tool 516, removal of the adhesive liner 522 followed by attachment of the adhesive layer of the appliqué 523' to aircraft surface 524.

Figure 5C:
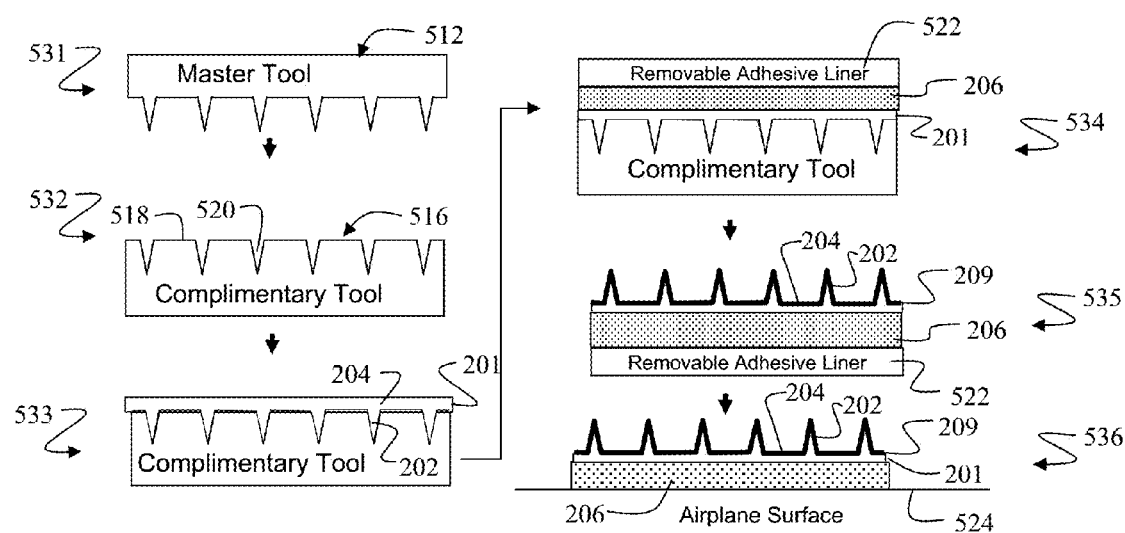
FIG. 5C is a flow diagram of processing steps for an exemplary method of fabrication of riblets of an alternative embodiment of FIG. 2C with deposition of a cladding.

FIG. 5C is a flow diagram showing an alternative manufacturing process for a riblet structure as defined in the embodiment described with respect to FIG. 2C. In step 531 a master tool 512 is created using, as previously described with respect to FIG. 5A. The tool as shown in FIG. 5B may be a section of a flat tool, roller or a rolled film tool employed for roll-to-roll web processing. A complimentary tool 516 is created in step 532 by impression on the master tool 512 which provides grooves 518 corresponding to the riblet shape. Spacing between the grooves provides a substantially flat intermediate surface 520 corresponding to the dimension 118 desired between the riblets 112. An elastomeric layer 201 is then cast into the complimentary tool 516 to provide both elastomeric tips 202 and surface layer 204 in step 533. In certain embodiments, a release compound is applied to the surfaces on the complimentary tool 516 to assist in removal of the elastomeric layer 201 from the tool. Adhesive layer 206 is then applied in step 534 to the high elongation elastomer layer 201 opposite the elastomeric tips 202. A removable adhesive liner 522 for handling of the completed appliqué is added as also shown in step 534. In step 535, which may be conducted prior to the addition of the adhesive and liner, the core layer 201 is removed from the complimentary tool 516 and a film or cladding 209 is deposited by sputtering or alternative deposition technique onto the high elongation elastomer layer 201. The elastomer layer may be treated prior to deposition by plasma treatment or corona treatment. Alternatively, as will be described with respect to the process of FIG. 5D, the cladding 209 may be deposited on the complimentary tool and the elastomeric layer 201 including surface layer 204 and tips 202 then cast or deposited onto the cladding. In addition to the UV protection as described with respect to the embodiment of FIG. 2C, the cladding 209 may provide resistance to electromagnetic effects which composite structure alone may not provide thereby substituting for or supplementing LSA foil appliqués and similar materials. The cladding 209 may also be multilayer or interference film, for example the multiple layers providing color and decorative effects (due to optical interference effects). Application to the aircraft surface 524 is accomplished as shown in step 536 by removal of the adhesive liner 522 followed by attachment of the adhesive layer 206 to aircraft surface 524.

Figure 5D:
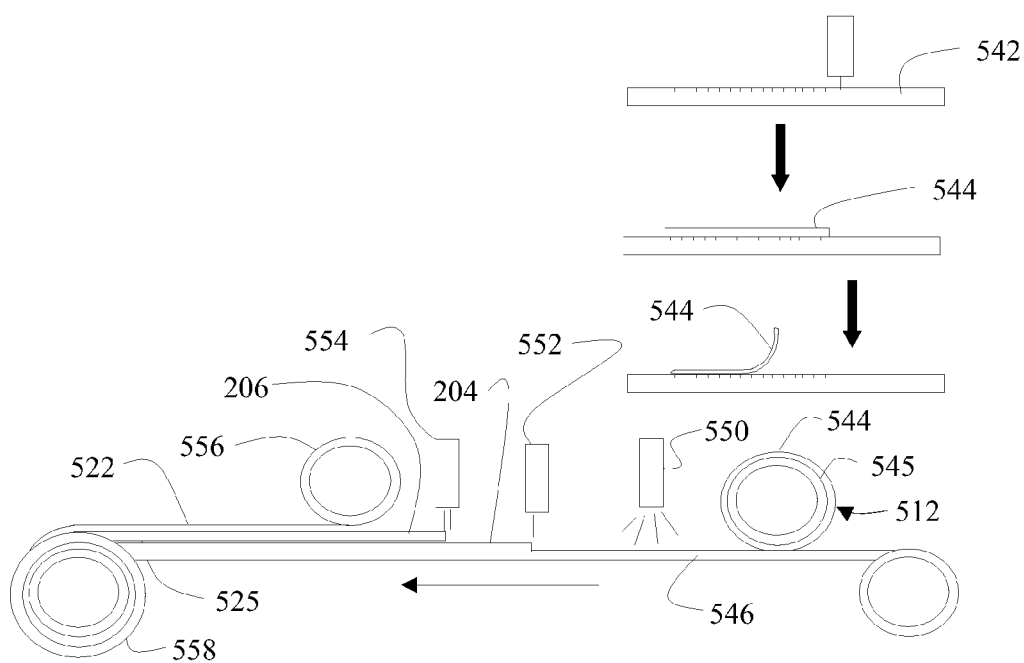
FIG. 5D is a schematic representation of roll processing elements and steps for use with an exemplary fabrication method as described with respect to FIG. 5B.

As shown in FIG. 5D, an exemplary roll-to-roll web processing approach may be employed for the methods described. Master tool 512 is created using, as an example, diamond machining of a copper form 542 on which an acrylate or other polymer film 544 is cured then stripped and applied to a roller 545 to provide the master tool 512 shown in the drawing. Complimentary web tool 546 is then created by impression on master tool 512. Sputtering of cladding 209 onto the web tool 546 is accomplished with sputtering tool 550 and high elongation elastomeric layer for tips 202 surface layer 204 is deposited onto the web tool 546 using a slot die, knife over roll, gravure or reverse roll coater 552. The adhesive layer 206 is then deposited on the surface layer 204 with deposition tool 554 and the removable adhesive liner 522 attached by application from roll 556. The multilayer appliqué 525 which includes the web tool 546 as a masking is collected on roll 558 and is then available for attachment to the aircraft surface 524 as described in the final steps of the methods of FIGS. 5A-5C. The web tool 546 is then removed to expose the riblet array.

While shown in the drawings and described as a process of laminating individual layers, in certain alternative methods for fabrication of the multilayer appliqué, the surface of a pre-made appliqué such as a LSA without a topcoat (designated TLA for short) with the metallic layer as the outer surface is laminated with a web tool to form the riblets. In another alternative, a web tool is coated with elastomer to form the riblets and then the pre-made TLA is laminated onto the coated web tool. In yet another alternative, the web tool is coated and cured, then in a separate step laminated to the TLA.

Figure 6:
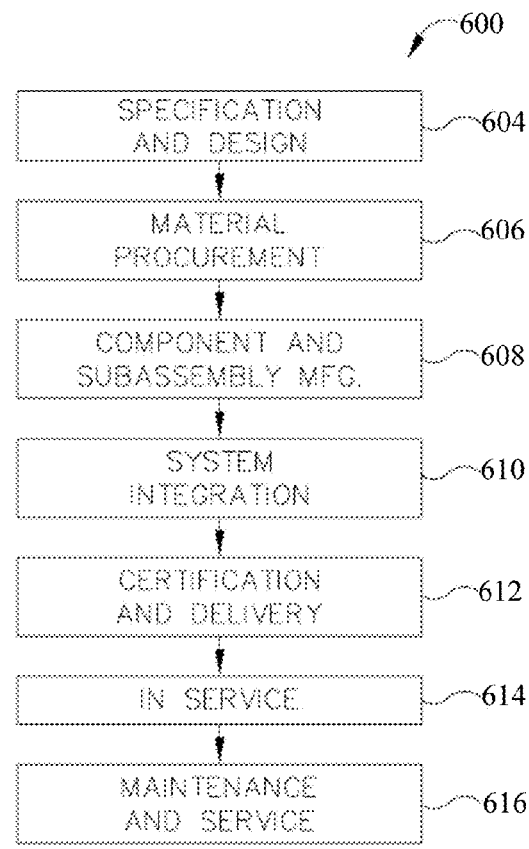
FIG. 6 is a flow diagram describing use of the elastomer riblet embodiments disclosed herein in the context of an aircraft manufacturing and service method.
Figure 7:
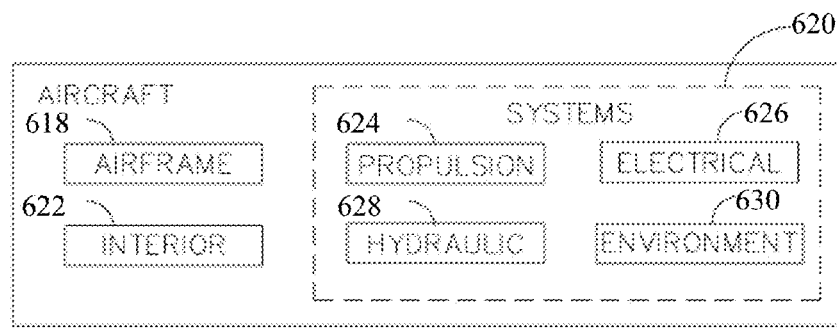
FIG. 7 is a block diagram representing an aircraft employing the elastomer riblets with embodiments as disclosed herein.

Referring more particularly to FIGS. 6 and 7, embodiments of the high elongation elastomeric riblets disclosed herein and the methods for their fabrication may be described in the context of an aircraft manufacturing and service method 600 as shown in FIG. 6 and an aircraft 602 as shown in FIG. 7. While described herein with respect to an aircraft, the embodiments disclosed are equally applicable to cars, boats, windmills, rotor blades, engine nacelles, intake ducts, ventilation systems or other surfaces with associated hydrodynamic or aerodynamic flow. During pre-production, exemplary method 600 may include specification and design 604 of the aircraft and material procurement 606. During production, component and subassembly manufacturing 608 and system integration 610 of the aircraft takes place. The riblet appliqués and their manufacturing processes as described herein may be accomplished as a portion of the production, component and subassembly manufacturing step 608 and/or as a portion of the system integration 610. Thereafter, the aircraft may go through certification and delivery 612 in order to be placed in service 614. While in service by a customer, the aircraft 602 is scheduled for routine maintenance and service 616 (which may also include modification, reconfiguration, refurbishment, and so on). The riblet appliqués as described herein may also be fabricated and applied as a portion of routine maintenance and service 616.

Each of the processes of method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 602 produced by exemplary method 600 may include an airframe 618 having a surface 111 as described with respect to FIG. 1 and a plurality of systems 620 and an interior 622. Examples of high-level systems 620 include one or more of a propulsion systems 624, an electrical and avionics system 626, a hydraulic system 628, and an environmental system 630. Any number of other systems may be included. The high elongation elastomeric riblets supported by the embodiments disclosed herein may be a portion of the airframe 618, notably the finishing of skin and exterior surfaces. Although an aerospace example is shown, the principles disclosed in the embodiments herein may be applied to other industries, such as the automotive industry and the marine/ship industry.

Apparatus and methods embodied herein may be employed during any one or more of the stages of the production and service method 600. For example, components or subassemblies corresponding to production process 608 may be fabricated or manufactured in a manner similar to components or subassemblies produced while the aircraft 602 is in service. Also, one or more apparatus embodiments, method embodiments, or a combination thereof may be utilized during the production stages 608 and 610, for example, by substantially expediting assembly of or reducing the cost of an aircraft 602. Similarly, one or more of apparatus embodiments, method embodiments, or a combination thereof may be utilized while the aircraft 602 is in service, for example and without limitation, to maintenance and service 616.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:

1. A construction for an array of riblets comprising:
   a first layer composed of high elongation elastomeric riblets, providing recovery after deforming with elongation in a range of 300% to 3000%, having tips and a surface layer with an organic cladding deposited on the high elongation elastomeric riblets;
   a second layer for adherence to a surface.

2. The construction for an array of riblets as defined in claim 1 wherein:
   said second layer includes a supporting polymer layer.

3. The construction for an array of riblets as defined in claim 2 wherein the second layer includes an adhesive layer.

4. The construction for an array of riblets as defined in claim 2 further comprising an adhesive layer deposited on the polymer support layer to form a multilayer appliqué, said adhesive layer adhering the appliqué to the vehicle surface.

5. The construction for an array of riblets as defined in claim 1 wherein the second layer comprises an adhesive layer deposited on the surface layer, said adhesive layer adhering to a vehicle surface.

6. A construction for an array of riblets comprising:
a first layer composed of high elongation elastomeric riblets, providing recovery after deforming with elongation in a range of 300% to 3000%, having tips and a surface layer with a cladding;
an adhesive layer deposited on the surface layer, said adhesive layer adhering to a vehicle surface;
a metallic layer and a polymer support layer intermediate the surface layer and the adhesive layer.

7. The construction for an array of rilets as defined in claim 6 wherein the metallic layer is discontinuous.

8. The construction for an array of riblets as defined in claim 1 wherein the high elongation elastomer is selected from the set of epoxy, polyurethane, polyurea, polyolefin, ethylene propylene, silicone, polybutadiene, polychloroprene, chlorinated polyethylene and fluorosilicones, fluorinated polyurethanes, perfluoropolyethers, sylilated polyurethanes, and other hybrid polymers that include polyhedral oligomeric silsesquioxane.

9. The construction for an array of riblets as defined in claim 1 wherein material for the high elongation elastomeric riblets is selected from the set of epoxy, polyurethane, polyurea, polyolefin, ethylene propylene, silicone, polybutadiene, polychloroprene, chlorinated polyethylene and fluorosilicones, fluorinated polyurethanes, perfluoropolyethers, sylilated polyurethanes, and other hybrid polymers that include polyhedral oligomeric silsesquioxane.

10. The array of riblets as defined in claim 1 wherein the cladding is UV reflective.

11. The array of riblets as defined in claim 1 wherein the organic cladding is selected from the set of thin films of parylene, PTFE, polyamide (Nylon), polyimide and polyethylene.

12. A construction for an array of riblets comprising:
a first layer composed of high elongation elastomeric riblets, providing recovery after deforming with elongation in a range of 300% to 3000%, having tips and a surface layer;
a second layer for adherence to a surface;
a cladding on the high elongation elastomeric riblets wherein the cladding fractures within the elastic limit of the high elongation elastomer and wherein the cladding adheres to the elastomer subsequent to fracture.

13. The array of riblets as defined in claim 1 wherein the high elongation elastomeric tips have a parabolic cross section.

14. An aircraft structure comprising:
an array of riblets having
a plurality tips and a surface layer formed from a high elongation elastomeric material selected from the set of epoxy, polyurethane, polyurea, polyolefin, ethylene propylene, silicone, polybutadiene, polychloroprene, chlorinated polyethylene and fluorosilicones, fluorinated polyurethanes, perfluoropolyethers, sylilated polyurethanes, and other hybrid polymers that include polyhedral oligomeric silsesquioxane;
a polymer support layer selected from the set of polyetheretherketone (PEEK), polyethereketoneketone (PEKK), polyetherketone(PEK), polyimide, polyamide, polyolefin, polyester, chloro- or fluoro-polymers such as polytetrafluoroethylene (PTFE), fluorinated ethylene propylene (FEP) or fluorinated polyurethane, polyethylene tetraphthalate (PET), silicones, epoxy, polysulfide, ethylene propylenediene, fluorosilicone, and fluoroelastomers;
a cladding overlaying the tips and surface layer selected from the set of organic cladding including thin films of parylene, PTFE, polyamide (Nylon), polyimide and polyethylene;
an adhesive layer deposited on the polymer support layer to form a multi layer appliqué, said adhesive layer adhering the appliqué to a surface of the aircraft.

* * * * *